３,232,888
PRODUCTION OF HYDROGENATION CATALYSTS CONTAINING COBALT

Karl Adam, Ludwigshafen (Rhine), Gartenstadt, Germany, assignor to Badische Anilin- & Soda-Fabrik Aktiengesellschaft, Ludwigshafen (Rhine), Germany
No Drawing. Filed Jan. 16, 1959, Ser. No. 787,127
Claims priority, application Germany, Jan. 17, 1958, B 47,482
9 Claims. (Cl. 252—435)

This invention relates to a new and improved process for the production of hydrogenation catalysts and to the new hydrogenation catalysts themselves. More specifically the invention relates to a new process for the production of cobalt containing catalysts which also contain chromium and/or manganese.

Cobalt-containing catalysts have been used for a long time in hydrogenations. The industrial cobalt catalysts are for the most part applied to inert carriers and contain small amounts of activated metals. Thus for example a cobalt hydrogenation catalyst is known which contains about 0.5 to 10% of chromium oxide or manganese oxide. For the technical usefulness of the catalyst, the durability of the same is of decisive importance because in many processes, especially in continuous processes, it is not possible to reactivate the catalyst during operation. Frequent operational interruptions for reactivation of the catalyst, which must usually be taken outside the reaction chamber, or for the replacement of the catalyst by a fresh catalyst, are often undesirable.

I have now found that hydrogenation catalysts suitable for hydrogenations which work with high throughputs and can be worked for long production periods without interruption are obtained by treating with an acid a cobalt-containing catalyst which also contains chromium and/or manganese and heating to a temperature at which the acid used is converted into its pyro or poly form.

For purposes of this application, the term "poly-acid" will be considered as including pyro-acids. A definition of poly-acids which indicates that the term is generic and includes pyro-acids is contained in Ephraim, "Inorganic Chemistry," 4th edition, pages 500–501 (1943). It is well known that the "poly-acid" is obtained by heating the corresponding ortho acid with intramolecular dehydration and subsequent condensation.

For the process there may be used all acids which are converted by heating to a high temperature, i.e. 350 to 700° C., into the pyro or poly form, i.e. into the corresponding pyro- or poly-acids, as for example phosphoric acid, sulfuric acid or boric acid. The acids are added to the catalyst, which if desired may also be applied to a carrier, preferably an inert and neutral carrier, prior to the heating which may be effected for example by heating in a muffle furnace. The catalysts are applied for example by treatment of the carrier substance with an aqueous metal salt solution to which the acid concerned, for example phosphoric acid, has been added. Thereupon the carrier impregnated with the catalyst solution may be heated after drying in a muffle furnace. In general additions of 0.05 to 5, advantageously 0.3 to 1.5% by weight of the acid with reference to the weight of catalyst used are sufficient to achieve the required durability. The catalysts are preferably heated at 350° to 700° C. in a muffle furnace. When using phosphoric acid it is advantageous to heat to 500° to 650° C.

The metals applied to the carrier by the metal salt solution may however also be heated for a long time at elevated temperature, for example 400° to 700° C., in a muffle furnace, cooled, and the acid only then added, preferably in aqueous solution by impregnating the catalyst with the solution and drying, and converted by a subsequent heat treatment at lower temperature into the corresponding pyro- or poly-acid. In this case even a heat treatment at temperatures of 200° to 350° C. is sufficient in order to impart to the catalyst the desired properties. The acids are converted by the heat treatment into their pyro or poly form and cause the special durability of the catalysts by binding the active components to the carrier material and/or by structural changes in the active components.

The catalysts may, however, also be used as so-called "full" catalysts, i.e. without a carrier. In this case the catalyst components are mixed in the desired relative proportions and 0.05 to 5%, advantageously 0.3 to 1.5% of the acid such as phosphoric or sulfuric acid, added and then heated to a temperature at which the acid is converted into its pyro or poly form, i.e. to 350° to 700° C.

It is especially advantageous to use the process for the production of catalysts which have been applied to carriers. As carriers for the catalysts there may be used fuller's earth, silica strings, silica gel, aluminum oxide and silicates, as for example magnesium silicate.

The catalysts prepared according to my invention preferably contain 5 to 30%, more preferably 10 to 20%, by weight of cobalt and less than 6% of chromium and/or manganese, preferably 0.03 to 5.0% of chromium and/or 0.1 to 2% of manganese.

The preferred embodiment of my invention in impregnating the carriers consists in using the water-soluble salts of the metals, i.e. the nitrates or sulfates thereof and converting them immediately into their oxides by heating. The best results are obtained by using the nitrates. But it is also possible to use other compounds, i.e. the carbonates or hydroxides which can be precipitated on the carriers from a solution of the soluble salts. These compounds are also converted into their oxides by heating.

The catalysts prepared according to the invention are suitable for all hydrogenation processes usual in organic chemistry which are carried out on a technical scale. The use of the catalysts prepared according to this invention is especially of advantage in hydrogenations carried out in continuous operation. The catalysts may be used for example in the hydrogenation of aliphatic carboxylic acid nitriles, dicarboxylic acid dinitriles to amines and diamines, respectively. A special advantage of the catalysts, apart from their durability, is the purity of the hydrogenation products obtained. In the hydrogenation of adipic acid dinitrile to hexamethylene diamine, very high requirements are placed on the purity of the hydrogenation product which is an intermediate product for the production of synthetic fibers. Traces of alkalies or alkaline earths cause during the hydrogenation the formation of byproducts which cannot be separated by distillative methods. The quality of the hexamethylene diamine obtained is thereby considerably diminished. By the process according to this invention however a catalyst is obtained in which the basic components are so firmly combined that they cannot be washed out by the hydrogenation product. When using catalysts on carriers for example in the thermal treatment, the readily soluble ortho-silicic acid and/or the aluminum hydroxide contained in the catalyst are converted into insoluble polysilicic acid and insoluble aluminum oxide. In this form they, and also the basic constituents which may originate from the carrier material for example, can no longer be dissolved out by the hydrogenation product so that troublesome side reactions are avoided, but on the other hand the durability of the catalyst is increased.

Since at the same time the catalysts prepared according to the invention have an increased activity, larger yields are also obtained by their use.

The following examples will further illustrate this invention but the invention is not restricted to these examples.

Example 1

A catalyst is prepared by introducing 700 grams of silicic acid strings into a solution of 766 grams of cobalt nitrate (Co(NO$_3$)$_2$·6H$_2$O), 12 grams of chromium trioxide and 6 grams of phosphoric acid in 800 ml. of water, drying the mixture at 110° C. and heating in a muffle furnace at 650° C.; the phosphoric acid added has been converted into insoluble pyrophosphates in the catalyst. After the heating in a muffle furnace, the catalyst is ground in a ball mill.

600 grams of adipodinitrile and 4200 grams of a mixture of 65% by weight of liquid ammonia and 35% by weight of crude hexamethylene diamine are hydrogenated with the catalyst prepared in this way. 50 grams of catalyst are used for the hydrogenation which is carried out at 70° C. and 300 atmospheres hydrogen pressure. When the absorption of hydrogen has ended, the ammonia is evaporated off and the diamine formed is filtered free from catalyst while hot. A water-clear crude hexamethylene diamine is obtained which solidifies to snow-white crystals (solidification point 40.1° C.) upon cooling. By distillation of the hydrogenation product a hexamethylene-diamine is obtained in a 98.2% yield with a melting point of 41° C. The absorption of hydrogen takes place in 5 hours. When using a catalyst without pyro- or poly-acids, the hydrogen absorption requires 11 hours. The life of the catalyst is increased by 40% according to the invention.

If an aqueous solution of the salt of adipic acid with hexamethylenediamine with a pH value of 7.55 is prepared from the resultant hexamethylene diamine and heated for 24 hours at 85° C. with access of air, the solution exhibits a color number of 18 Hazen units. Amino-capronitrile is also no longer detectable chromato-graphically, nor is ortho-diaminocyclohexane.

The same results are obtained by using aluminum oxide as carrier instead of silicic acid strings and treating it with the solution described above.

Example 2

790 grams of aluminum oxide are introduced into a solution of 996 grams of cobalt nitrate

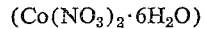
(Co(NO$_3$)$_2$·6H$_2$O)

19 grams of chromium trioxide and 3 grams of phosphoric acid in 800 ml. of water. The mixture is dried at 110° C. and then heated at 550° C. in a muffle furnace for 30 hours. The catalyst is then ground in a ball mill. This catalyst is suitable for example for the hydrogenation of suberodinitrile. By the hydrogenation there is obtained a crude octamethylene diamine as a water-clear liquid which solidifies at 51.7° C. The salt solution with adipic acid prepared according to Example 1 has, after heating for 24 hours at 85° C., a color number of only 5 Hazen units.

Example 3

700 grams of silicic acid strings are impregnated with a solution of 766 grams of cobalt nitrate

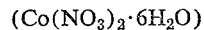
(Co(NO$_3$)$_2$·6H$_2$O)

32 grams of manganese nitrate (Mn(NO$_3$)$_2$·6H$_2$O) and 6 grams of phosphoric acid in 800 ml. of water. The impregnated strings are dried at 110° C. and calcined for 36 hours at 600° C., the phosphoric acid thereby being converted into insoluble phosphates or polyphosphoric acid.

5000 kilograms of that catalyst are charged into a furnace of 0.8 meter internal width and 18.0 meters length and reduced with hydrogen.

The catalyst is first loaded with 450 kilograms of adipo-nitrile and 800 kilograms of ammonia per hour until the reaction is operating completely. With stationary operation, 300 atmospheres hydrogen pressure is used and a large part of the hydrogenation product, which is led in circulation, is used as a solvent. 800 kilograms of ammonia and 650 kilograms of adipodinitrile are supplied per hour to the liquid circulating and a corresponding proportion of hydrogenation product removed. A sample of the hydrogenation product, after evaporation of the ammonia, gives a completely water-clear crude hexamethylene diamine of the melting point 40.2° C. Distillation gives, besides 0.4% of hexamethylene imine and 1.8% of fractions of higher boiling point, 97.8% of pure hexamethylene diamine of the melting point 41.0° C. The color number test according to Example 1 shows 15 Hazen units. Epsilon-amino-capronitrile and otho-diaminocyclohexane are undetectable.

The life of the catalyst is about 40% higher than when using a catalyst which contains no phosphoric acid.

What I claim is:

1. A process for the production of a hydrogenation catalyst which comprises adding an acid selected from the group consisting of phosphoric, sulfuric and boric acid in an amount of 0.05 to 5% by weight to a catalyst in which the essential catalytically active components are cobalt and at least one metal selected from the group consisting of chromium and manganese, and heating said catalyst in the presence of said acid to a temperature of from 350° C. to 700° C., said temperature being sufficient for conversion of said acid into its poly-acid form.

2. A process as claimed in claim 1 wherein an inert carrier is treated with an aqueous solution of said acid and of the water-soluble salts of the essential catalytically active metals, and is then heated to a temperature of from 500° C. to 650° C.

3. A process as claimed in claim 1 wherein an inert carrier is treated with an aqueous solution of phosphoric acid and of the nitrates of the essential catalytically active metals, and is then heated to a temperature of from 500° C. to 650° C.

4. A process for the production of a hydrogenation catalyst which comprises: first impregnating an inert carrier with an aqueous solution of the water-soluble salts of cobalt and of at least one metal selected from the group consisting of chromium and manganese and heating the impregnated carrier to a temperature of from 600° C. to 700° C.; and then further impregnating said carrier with an aqueous solution of about 0.05 to 5% by weight with reference to the catalyst of an acid selected from the group consisting of phosphoric, sulfuric and boric acid and heating in the presence of said acid at a temperature of from 200° C. to 350° C., said temperature being sufficient for conversion of said acid into its poly-acid form.

5. A hydrogenation catalyst consisting essentially of an inert carrier to which there has been applied cobalt in an amount of 5 to 30% by weight, at least one metal selected from the group consisting of chromium and manganese in an amount of less than 6% by weight, and an acid selected from the group consisting of phosphoric, sulfuric and boric acid, said acid being initially applied in an amount of 0.05 to 5% by weight and subsequently converted into the corresponding poly-acid, said percentages by weight being taken with reference to the total weight of the catalyst.

6. A hydrogenation catalyst as claimed in claim 5 wherein said metal selected from the group consisting of chromium and manganese is present in an amount of about 0.03 to 5% by weight.

7. A hydrogenation catalyst as claimed in claim 5 consisting essentially of said inert carrier with 10 to 20% by weight of cobalt, 0.03 to 5% by weight of chromium and polyphosphoric acid as obtained by the initial application of 0.05 to 5% by weight of phosphoric acid.

8. A hydrogenation catalyst as claimed in claim 5 consisting essentially of said inert carrier with 10 to 20% by weight of cobalt, 0.1 to 2% by weight of manganese and polyphosphoric acid as obtained by the initial application of 0.05 to 5% by weight of phosphoric acid.

9. A hydrogenation catalyst consisting essentially of the components:
 (a) cobalt;
 (b) at least one metal selected from the group consisting of chromium and manganese; and
 (c) an acid selected from the group consisting of the poly-acid forms of phosphoric, sulfuric and boric acid, there being 5 to 30 parts by weight of (a) to less than 6 parts by weight of (b), and (c) being present in an amount equivalent to the addition of the corresponding ortho acid in an amount of 0.05 to 5% by weight with reference to the total weight of the catalyst.

References Cited by the Examiner
UNITED STATES PATENTS

| | | | |
|---|---|---|---|
| 2,210,148 | 8/1940 | Indest | 252—435 |
| 2,496,621 | 2/1950 | Deery | 252—435 |
| 2,500,197 | 3/1950 | Michael et al. | 252—432 X |
| 2,692,241 | 10/1954 | Mavity | 252—435 |
| 2,704,747 | 3/1955 | Bielawski | 252—435 |
| 2,717,230 | 9/1955 | Murray et al. | 252—435 X |
| 2,802,876 | 8/1957 | Broich et al. | 252—432 |
| 3,009,957 | 11/1961 | Adam | 252—436 X |
| 3,050,571 | 8/1962 | Fleming et al. | 252—439 |
| 3,057,807 | 10/1962 | Cox et al. | 252—432 |

MAURICE A. BRINDISI, *Primary Examiner.*
JULIUS GREENWALD, *Examiner.*